INVENTOR.
W. F. VERNON

United States Patent Office

3,817,708
Patented June 18, 1974

3,817,708
ALKYLATION APPARATUS
Walter F. Vernon, Bartlesville, Okla., assignor to
Phillips Petroleum Company
Continuation-in-part of abandoned application Ser. No.
14,062, Feb. 25, 1970. This application Apr. 10, 1972,
Ser. No. 242,542
Int. Cl. C07c 3/54; F28d 7/06
U.S. Cl. 23—260                        7 Claims

ABSTRACT OF THE DISCLOSURE

Fluid heat exchangers comprising two U-tube bundles disposed within a common exterior shell with their respective bends in an adjacent, nonoverlapping relationship at the mid portion of said shell, wherein multiple exchanger shells can be placed in a side-by-side position, joined with communicating entry and exit fluid conduits. The heat exchangers communicate through fluid outlet headers to tubular reactors in combination with an alkylation settler.

---

This application is a continuation-in-part of my copending application Ser. No. 14,062, filed Feb. 25, 1970.

This invention relates to an indirect fluid heat exchanger. In another aspect, this invention relates to an arrangement of U-tubes with their respective bend portions in an adjacent, nonoverlapping relationship enclosed in a common exterior shell. In yet another aspect of this invention, the heat exchanger shell can be positioned with a second exchanger in a side-by-side relationship with said shells communicating through common fluid entry and exit conduits. In still another aspect this invention relates to multiple fluid heat exchangers which provide symmetrical fluid flow to reactor riser tubes.

The chemical processing art of today faces varied problems, many of which are related to efficient mass transfer and reactant temperature control. Chemical fluids used in modern production methods often require stronger process apparatus made from corrosive resistant materials. For example, the catalytic alkylation of hydrocarbons requires the continuous cyclic transportation of acid catalyst throughout the reaction and recovery system. The problem of handling highly corrosive acid catalysts such as hydrofluoric or sulfuric acids leads to special equipment requirements. Special alloy valves, vessels, pumps, and heat exchangers are required in the catalytic acid alkylation of hydrocarbons which greatly increases the equipment costs. The effect of temperature upon an alkylation process is critical and removal from or addition of heat to the reaction is an essential feature of the process, often dictating and limiting the design of the alkylation unit to be employed.

The apparatus of my invention provides a heat exchanger system which can greatly increase the capacity, for example, of an alkylation unit. A suitable heat transfer media, for example, water, flows through the U-tubes while an alkylation catalytic acid flows through the remaining space within the cylindrical shell which houses the U-tubes. Each cylindrical shell contains two U-tube bundles. The bends of the U-tubes approach each other near the center of the shell in an adjacent, spaced-apart, nonoverlapping relationship. The bend portions of the U-tubes are connected through the straight tube portions to coolant headers at the respective ends of the exterior shell. The alkylation catalytic acid enters the heat exchanger through headers at each end of the shell and exits from the center portion of said shell. Two cylindrical shell exchangers of my invention can be joined in a side-by-side relationship and joined with communicating acid entry and exit conduits. The multiple fluid heat exchangers in a side-by-side relationship can also communicate with a reactor riser.

It is an object of this invention to provide a more efficient mass transfer heat exchanger.

It is another object of this invention to provide an increased heat exchanger capacity while reducing space, equipment, and production costs.

It is yet another object of this invention to provide symmetrical flow of cooled alkylation acids to reactor riser tubes from multiple heat exchangers.

The heat exchanger of my invention increases mass transfer and cooling capacity with a minimum equipment space requirement. The adjoining of multiple heat exchangers of my invention reduce cyclic pressure drop, therein increasing fluid flow rates. The symmetrical and shorter flow patterns achieved through the applications of my invention provide the increased mass and energy transfer rates required by modern process engineering.

The apparatus, specifically the heat exchangers of the invention, have application in catalytic alkylation processing. For example, hydrofluoric acid alkylation is a process wherein olefins such as propylene, butylene, or pentene are combined with isobutane in the presence of hydrofluoric acid catalyst to yield a product in a gasoline boiling range. The product produced is called alkylate. Alkylate is produced from hydrocarbons which are too light and too volatile for use in gasoline through the hydrofluoric acid catalyzed chemical joining of these light hydrocarbons. Hydrofluoric acid alkylation of these light hydrocarbons produces heat which must be removed in order to control reaction temperature. Reaction temperature control is achieved through the cooling of the hydrofluoric acid before it is mixed with the reactor feed. Optimum reaction temperature will vary somewhat depending on operating conditions and character of the olefin feedstock, but a temperature of from about 85 to 100° F. is representative of alkylation reaction processing.

A more complete understanding of the invention may be had by reference to the accompanying drawing wherein.

Figure 1:
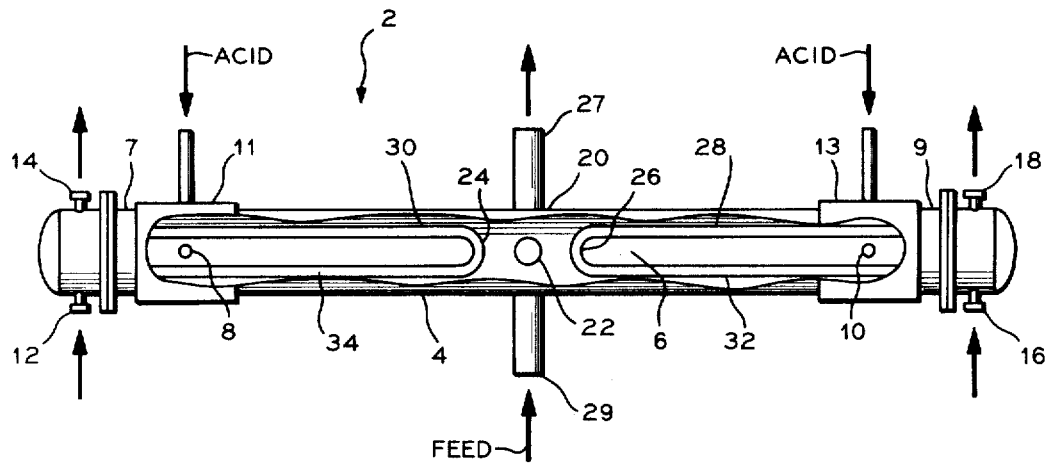
FIG. 1 is a front elevational view of the heat exchanger of the invention.

Referring to FIG. 1, a heat exchanger 2 has an outer shell 4. Shell 4 has an opening 6 extending longitudinally through its length from a first end 7 to a second end 9. Shell 4 has an opening 8 at a first end portion 11 and an opening 10 at a second end portion 13. The first end 7 of shell 4 has a lower opening 12 and an upper opening 14. The second end 9 of shell 4 has a lower opening 16 and an upper opening 18. A mid portion 20 of the shell 4 has a horizontal opening 22 spaced between adjacent, spaced-apart, nonoverlapping bend portions 24 and 26 of the U-tubes 28 and 30. Said U-tubes 28 and 30 have bend portions 24 and 26 at the mid portion 20 of shell 4 and straight tube portions 32 and 34 extending longitudinally to the first end 7 and the second end 9, respectively through the shell 4 opening 6.

Figure 2:
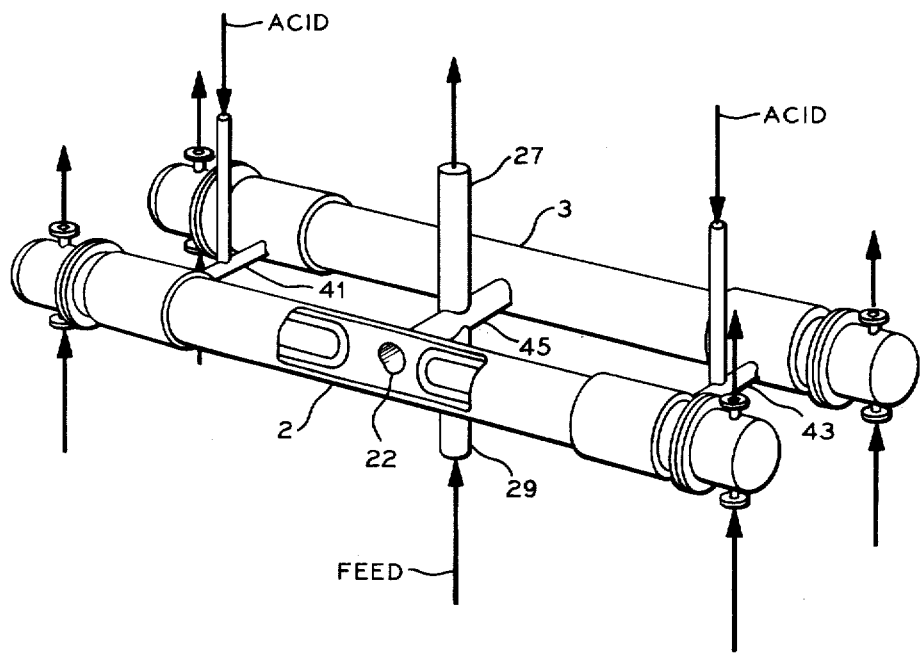
FIG. 2 is a perspective view of another embodiment of the invention.

Referring to FIG. 2, the heat exchanger 2 of FIG. 1 is placed with a second heat exchanger 3 in a side-by-side horizontal arrangement. The two exchangers 2 and 3 are adjoined through the fluid inlet conduits 41 and 42. The heat exchangers 2 and 3 are also joined through a common fluid outlet conduit 45. The heat exchange opening 22 of FIG. 1 is an open end of outlet conduit 45, positioned between the adjacent, spaced-apart, nonoverlapping U-bends of exchanger 2.

Figure 3:
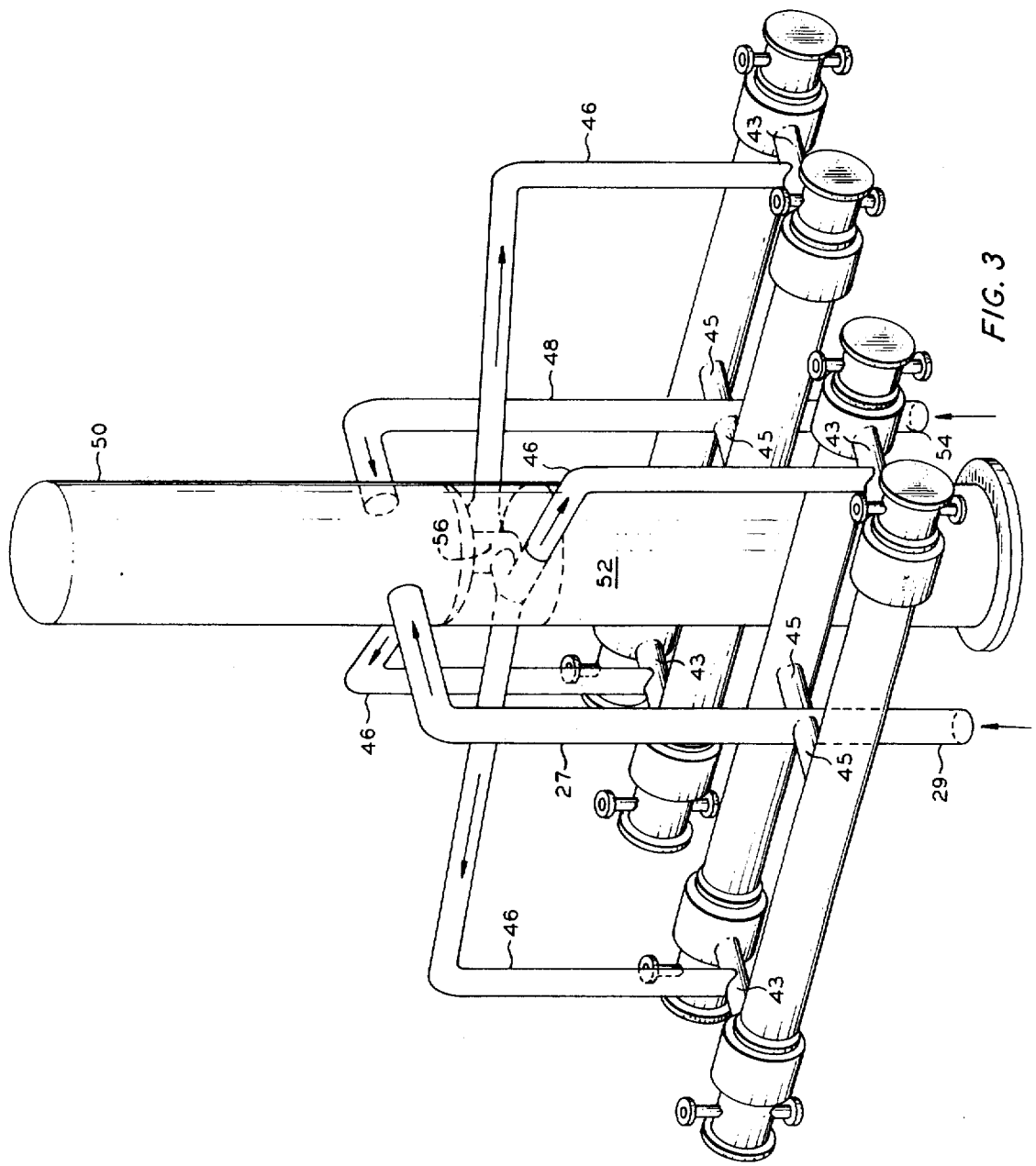
FIG. 3 is a diagrammatic illustration of a vertical alkylation reactor tube, acid settler, acid rerun conduit, acid cooler, and acid storage provided in an arrangement which fully exploits the symmetrical acid cooling and flow provided by the apparatus of the invention.

Referring to FIG. 3, the heat exchangers of FIGS. 1 and 2 are arranged in multiples of two on opposite sides of an acid storage 52 having a settler 50 vertically positioned thereabove. The heat exchangers in a side-by-side horizontal arrangement communicate with tubular reactors 27 and 48 on respective side of the acid storage 52 and settler 50 through fluid outlet conduits 45. The tubular reactors 27 and 48 are in communication with hydrocarbon feed sources, not shown, through riser conduits 29 and 54 respectively. Acid return conduits 46 flow from the elevated settler 50 acid return header 56 to the common fluid inlet conduits 43 shared by the multiple heat exchangers of the invention.

In the operation of the apparatus of FIG. 1, recycle fluid, for example, alkylation catalytic acid, enters the heat exchanger 2 through the openings 8 and 10 where it is cooled by indirect heat exchange with the heat transfer media which enters the U-tubes 28 and 30 through the openings 16 and 12, and leaves through openings 14 and 18. The cooled acid flows inwardly to the mid portion 20 opening 22 and then is passed through the tubular alkylation reactor 27. There it is contacted by hydrocarbon feed passing through the conduit 29.

In the operation of the apparatus of FIG. 2, recycle alkylation acid enters the heat exchangers 2 and 3 through joining conduits 41 and 43 and exits through the communicating conduit 45 to a common flow tubular reactor 27. Cooling fluid enters and exits the four respective ends of the two horizontal cylindrical exchanger shells providing indirect cooling for the alkylation acid. FIG. 3 provides a multiple application of the apparatus of FIG. 2 and functions accordingly.

Alkylation reactors, settler-acid storage, and hydrofluoric acid cooling system of the type illustrated in the drawings is employed for the alkylation of isobutane and light olefinic hydrocarbons in the presence of hydrofluoric acid catalyst. The following alkylation apparatus and process conditions are for illustrative purposes and are afforded by the symmetrical flow and energy exchange achieved by the heat exchanger-reactor of the invention. For example, a settler having the dimensions of 26 ft. by 66 ft. in an elevated position would provide sufficient capacity for two reactor risers having a 66-inch diameter. The four acid return conduits to the exchangers would need to be about 30 inches in diameter since the hydrofluoric acid to hydrocarbon feed preferably varies from about 4:1 to about 6:1 by liquid volume. The heat exchangers would correspondingly have the approximate dimensions of 55-inch diameter shells having total lengths of about 80 ft. Apparatus of these dimensions can accommodate about 50,000 barrels per day of new hydrocarbon feed and 227,135 barrels per day of recycle feed at a temperature of about 95° F. The return acid temperature to the exchangers is about 95° F. and is lowered to about 86° F. through energy exchange.

The hydrofluoric acid alkylation apparatus of my invention provides a self-circulating acid cooling system which requires equal material flow in order to achieve the expanded flow demands as illustrated in the following table:

It is readily apparent from the above volumes that equal flow of acid through the exchangers and communicating riser reactors is critical. Self-circulating volume and energy transfer apparatus of this magnitude places such a demand on heat exchanger capacity that design limitations have in the past limited the overall volume of the alkylation unit. The apparatus of FIGS. 1, 2 and 3 affords an equal and balanced acid flow demanded by modern alkylation process engineering.

The apparatus of FIGS. 1 and 2 can be duplicated as needed through applications of multiples of two U-tube exchanger units as enclosed in their common exterior shells, for example, as shown in FIG. 3. Other variations and modifications are also possible within the scope of this disclosure without departing from the scope and spirit thereof.

What I claim is:

1. A fluid heat exchanger comprising: an elongated shell, at least one pair of U-tubes disposed within said shell with respective bends in adjacent, spaced-apart, nonoverlapping relationship at a center portion of said shell, an inlet and outlet leader connected to each U-tube at each end of said shell, fluid inlet headers connected to the ends of said shell and a fluid outlet header connected to the center portion of said shell between the adjacent, spaced apart, nonoverlapping bends of the U-tubes, said fluid headers in relation to said shell to direct fluid flow in a path along the length of said U-tubes.

2. A fluid heat exchanger according to claim 1 wherein the fluid outlet header connected to the mid portion of said heat exchanger shell communicates with a tubular reactor.

3. A fluid heat exchanger according to claim 1 wherein at least two of the heat exchangers are positioned in a side-by-side relationship with the heat exchangers communicating through common fluid inlet and outlet means.

4. A fluid heat exchanger according to claim 3 wherein the heat exchangers communicate through the common fluid outlet means with a tubular reactor.

5. Fluid heat exchanger-tubular reactor apparatus comprising, in combination: a pair of elongated shells having at least one pair of U-tubes disposed within each of the shells with respective heads in adjacent, spaced-apart, nonoverlapping relationship at center portions of said shells; inlet and outlet headers connected to each U-tube at each end of said shells; fluid inlet headers connected to the ends of said shells and fluid outlet headers connected to the center portions of said shells between the adjacent, nonoverlapping, spaced-apart bends of the U-tubes, said fluid headers in relation to said shell to direct fluid flow in a path along the length of said U-tubes; and a tubular reactor spaced between the elongated shells in communication with the fluid outlet headers and an alkylation settler.

6. The apparatus according to claim 5 wherein at least two pairs of fluid heat exchangers are positioned in paired side-by-side relationship with a first pair of heat exchangers communicating through common fluid inlet and

TABLE.—BARRELS PER DAY

| Material components | Hydrocarbon feed | Recycle isobutane | Riser reactor hydrocarbon feed | Riser reactor hydrofluoric acid feed at a 4:1 liquid volume ratio | Settler-to exchanger return hydrofluoric acid |
|---|---|---|---|---|---|
| Hydrofluoric acid | | 1,048 | 1,048 | 1,105,532 | 1,105,507 |
| Ethane | 13 | 52 | 65 | | |
| Propylene | 5,195 | | 5,195 | | |
| Propane | 2,796 | 20,965 | 23,761 | | |
| Isobutane | 20,240 | 182,730 | 202,970 | | |
| Butenes | 6,932 | | 6,932 | | |
| Normal Butane | 4,002 | 16,372 | 20,374 | | |
| Amylenes | 3,486 | | 3,486 | | |
| Pentene plus | 6,584 | 5,968 | 12,552 | | |
| Total barrels per day | 49,248 | 227,135 | 267,383 | 1,105,532 | 1,105,507 | outlet means with the alkylation settler and a first reactor riser on one side of the settler; and a second pair of heat exchangers communicating through common fluid inlet and outet means with the alkylation settler and a second reactor riser on another side of the settler.

7. The apparatus according to claim 6 wherein the settler communicates through four equal flow acid return conduits with the common inlet means of the heat exchangers.

References Cited

UNITED STATES PATENTS

| 3,169,153 | 2/1965 | Walker et al. | 260—683.48 |
| 3,212,860 | 10/1965 | Vernon | 260—683.48 |
| 3,246,047 | 4/1966 | Chapman et al. | 260—683.48 |
| 3,281,213 | 10/1966 | Waddill | 260—683.48 |
| 3,544,651 | 12/1970 | Chapman | 260—683.48 |

OTHER REFERENCES

"Heat Exchangers," Manual #700–A, Patterson-Kelly Co., Inc., East Stroudsburg, Pa. (1959), pp. 6–18; POSL, TP–363–P37, FIG. 16 relied upon.

MORRIS O. WOLK, Primary Examiner

T. W. HAGAN, Assistant Examiner

U.S. Cl. X.R.

23—285; 165—143, 158; 260—683.48